US005986819A

United States Patent [19]

Steinblatt

[11] Patent Number: 5,986,819

[45] Date of Patent: Nov. 16, 1999

[54] PLOTTING HEAD WITH INDIVIDUALLY ADDRESSABLE LASER DIODE ARRAY

[75] Inventor: Serge Steinblatt, Raanana, Israel

[73] Assignee: Scitex Corporation Ltd., Herzlia, Israel

[21] Appl. No.: 09/064,741

[22] Filed: Apr. 23, 1998

[30] Foreign Application Priority Data

May 16, 1997 [IL] Israel ........................................ 120841

[51] Int. Cl.[6] ........................... G02B 13/22; G02B 13/08; G02B 26/02

[52] U.S. Cl. .......................... 359/663; 359/668; 359/710; 359/207; 385/33; 347/244; 347/258

[58] Field of Search .................................... 347/244, 258; 359/204, 205–207, 663, 668, 710; 369/112; 385/77, 33

[56] References Cited

U.S. PATENT DOCUMENTS

| | | | |
|---|---|---|---|
| 4,147,403 | 4/1979 | D'Auria et al. | 385/77 |
| 4,520,471 | 5/1985 | Carlin | 369/112 |
| 4,520,472 | 5/1985 | Reno | 369/112 |
| 4,932,734 | 6/1990 | Sakuma et al. | 359/207 |
| 5,168,288 | 12/1992 | Baek et al. | 347/240 |
| 5,521,748 | 5/1996 | Sarraf | 359/321 |
| 5,541,951 | 7/1996 | Juhasz et al. | 372/101 |
| 5,594,752 | 1/1997 | Endriz | 347/241 |
| 5,745,153 | 4/1998 | Kessler et al. | 347/244 |
| 5,774,248 | 6/1998 | Komatsu | 359/204 |

*Primary Examiner*—Georgia Epps
*Assistant Examiner*—Evelyn A. Lester
*Attorney, Agent, or Firm*—Mark M. Friedman

[57] ABSTRACT

A compact optical system for imaging an array of light emitters, particularly an individually addressable laser diodes array, onto a recording surface, whereby the image of each emitting region is spread in the cross direction to a width approximately equal to its length dimension. The system consists of a main non-anamorphic imaging lens assembly and a single cylindrical lens disposed between the array and the imaging lens assembly, with its focal line parallel to the array's centerline. There will occur a spread of the short dimension of the imaged emitting regions due to defocusing at the recording surface. Also, the numerical aperture of the emitted beams in the transverse axis is reduced prior to entry into the imaging lens assembly.

30 Claims, 9 Drawing Sheets

PLOTTING HEAD WITH INDIVIDUALLY ADDRESSABLE LASER DIODE ARRAY

FIELD AND BACKGROUND OF THE INVENTION

The present invention relates to a printhead for an electrooptical plotter and, more particularly, to a printhead that produces a multiplicity of light spots on a surface to be plotted, such as that of a printing plate in a plate imagesetter.

In a laser imagesetter, the light from one or more laser sources is focused onto the surface of a light sensitive film or plate. For brevity, this surface (whether of a film or a plate) will be referred to hereunder as the film. The plotting rate is generally limited by the power of the laser beam and by the speed at which it can be made to sweep the surface of the film. The power limitation is particularly problematic in plate imagesetters, owing to the inherently low light sensitivity of current printing plates. In order to achieve a high plotting rate, it is known to employ a multiplicity of laser sources, usually laser diodes (LDs), operating in parallel and producing a multiplicity of traces on the film when scanning it. A practical device for such a purpose is an individually addressable laser diode array (IALDA), which consists of a single bar of semiconducting material, such as GaAs, in which a linear array of addressable lasing sections has been formed. It is noted that such an IALDA device is distinct from a non-addressable laser diode array device, which has been used in imagesetters as a light source to illuminate an array of light modulators. The advantages of IALDA over an array of discrete LDs are much lower costs and the closer achievable spacing of the individual lasing sections, although they still cannot be contiguous. One possible disadvantage of IALDA is that at high power output any one section may fail, which would render the whole device useless for plate plotting. Recently, however, practical IALDA devices of sufficient power and reliability have become available.

Two important characteristics of any laser diode, or lasing section in an LD array device, particularly in the case of multi-mode LD (which serves for high power applications, such as that addressed by the present invention), are that (1) the light emitting region has a very elongated shape, typically 1 micron across and 50 to 200 microns along, and (2) the beam divergence in the cross direction is relatively high—typically 45 degrees FWHM, corresponding to a numerical aperture (NA) of 0.4—while in the length direction it is relatively low—typically 12 degrees FWHM, corresponding to a NA of 0.1.

In one common type of light projection system of prior art, employed inter alia in imagesetters, the light beams emitted by an IALDA device, or a linear array of laser diodes, is simply focused by an objective lens onto the film, thus forming on the film an array of projected spots, which is the image of the array of lasing regions, as is illustrated in FIG. 1. The film travels in a certain direction 44, causing the light spots to record parallel traces 46 on the film, as shown. Now, if the light emitting regions on the array, and consequently also the projected spots, were essentially contiguous, the array would be oriented so that the length axis 42 of its image is normal to the direction of travel 44. Since, however, the spots are generally not contiguous, the device or the array is usually turned, in a plane parallel to the film, so that length axis 42 becomes oriented by an angle $\alpha$ with respect to the direction normal to the direction of travel 44, and thus traces 46 become closer together. If the pitch of the spots, i.e. the distance between the centers of adjacent spots, is p, then, clearly, the pitch of the traces will be $p'=p*\cos\alpha$. The individual laser sources are modulated so that the resultant intensities along each trace 46 vary according to the picture being plotted, the relative timing of modulation among the various sources being adjusted so that resultant features of the picture become properly aligned on the film. Angle $\alpha$ is chosen so that the pitch of the traces, p', assumes a desired value. Ideally, the projected width of each spot, in a direction normal to the trace, is equal to the pitch, p'. In the case of discrete LDs, each LD would be oriented so that the long dimension of each emitting region remains normal to trace direction 44; angle $\alpha$ and the projection parameters can then be chosen so that trace contiguity is maintained. However, in the case of an LD array device, such as an IALDA, the length axis of each lasing region fixedly coincides with the long axis of the array. As a result, the length axis of each projected spot forms an angle $\alpha$ with the normal to trace direction 44 and consequently the effective trace width, w', becomes narrower than the actual spot width, w, along its length axis. The relation, again, is $w'=w*\cos\alpha$. It is noted that the ratio of the effective trace width, w', to the trace pitch, p', is equal to the ratio of the spot width, w, to the array image pitch, p, and thus remains constant regardless of the value of angle $\alpha$.

The second characteristic, namely the anamorphic beam divergence, may cause a difficulty in designing light efficient projection optics, since the numerical aperture of the objective lens must then be very large. It is noted that usually the length of each projected spot need to be in the range of 10–30 microns and thus—much smaller than the length of each emitting region. This requires the projection optics to effect minification, which further increases the necessary NA on their exit side, if they are to accommodate the entire beam.

the aforementioned difficulties may be overcome by employing anamorphic projection optics, such that have a large numerical aperture in the cross direction only and such that will create an as nearly circular spot image as possible.

One general configuration of such optics is an a focal arrangement, which consists of a collimating objective lens, or group, a focusing lens, or group, and an anamorphic modification. One method of such a modification, employed, for example, in U.S. Pat. Nos. 4,520,471 and 4,932,734, is to interject between the two lens groups (which by themselves are generally spherical) a pair of cylindrical lenses that act as a beam expander, or as a modifier of beam expansion, in one axis. Another method, employed, for example, in U.S. Pat. Nos. 5,541,951 and 5,594,752 (FIGS. 1–3), is to compose the objective assembly out of cylindrical lenses of different powers in each axis. It is noted that in both of the last mentioned patents, it is aimed to produce a single spot out of the multiple light sources and therefore there is an array of objective cylindrical lenses in one axis. It is further noted that in the '951 patent, the order of the cylindrical lenses in the two axes is such as to allow the beams to greatly expand in the cross axis and thus more fill the aperture of the focusing lens. It is also further noted that in the '752 patent (FIGS. 4–5) there is provision for a multiplicity of writing spots, whereby each spot is created by an individual focusing lens (each obtaining a collimated beam as described for FIGS. 1–3).

A different anamorphic configuration is taught in U.S. Pat. No. 5,521,748, which generally addresses the task of illuminating an array of light modulators (LM) by means of a non-addressable LD array (an alternative arrangement for imagesetters, mentioned hereabove, with which the present invention is not concerned). Here a certain optical configuration that includes cylindrical lenses in the longitudinal axis, images all light sources onto all the elements of the LM, while another, single cylindrical lens focuses the light sources onto the LM in the cross axis; there is little concern, if any, with the anamorphic ratio or other relationships between the two axes, since there is no reference to a projected spot shape.

A serious disadvantage of anamorphic configurations of prior art, such as described hereabove, is their relative complexity, which results in undue fabrication costs.

In another type of LD array light projection system of prior art, exemplified by U.S. Pat. No. 5,168,288 and also commonly employed in imagesetters, the light emitted by each source is coupled into a corresponding optical fiber; the other ends of all such fibers are arranged in close proximity along a line and projected together by an objective lens onto the film. Such a system overcomes the difficulties arising from both characteristics mentioned with respect to the lasing region, since essentially the entire beam is coupled into its corresponding fiber and since the light emission from each fiber has an essentially circular cross-section. It, however, shares the cost disadvantage of the first type, described hereabove, in that it is difficult to precisely assemble the fibers into the desired arrangement.

There is thus a widely recognized need for, and it would be highly advantageous to have, an anamorphic optical system that projects light from an individually addressable laser diode array as an array of rounded spots, which is simple and inexpensive to fabricate.

SUMMARY OF THE INVENTION

The present invention successfully addresses the shortcomings of the presently known configurations by providing a simple and compact optical system for imaging an array of light emitters, such as a laser diode array, and particularly an individually addressable laser diode array, onto a recording surface, whereby the image of each emitting region is spread in the cross direction to a width approximately equal to its length dimension.

The present invention discloses a novel optical arrangement, consisting of a main non-anamorphic imaging lens assembly and a single cylindrical lens disposed between the array and the imaging lens assembly, with its focal line parallel to the array's centerline.

More specifically, the imaging lens assembly, which preferably has a confocal telecentric configuration, focuses the image along the length axis. The cylindrical lens is made to form either a real image of the array's centerline (that is—a real image of the array in the transverse axis) in front of the imaging lens assembly or a virtual image of the array's centerline behind the array. In the first case, the array's image will be focused in the transverse axis at a plane behind the recording surface; in the second case, the array's image will be focused in the transverse axis at a plane in front of the recording surface. In either case there will occur a spread of the short dimension of the imaged emitting regions due to defocusing at the recording surface. Also, in either case, the numerical aperture of the emitted beams in the transverse axis is reduced prior to entry into the imaging lens assembly.

According to the present invention there is provided an optical system for projecting the light emitted from a linear array of light emitting regions within a planar surface, particularly that of an individually addressable laser diodes array device, onto a recording surface, each region having a long axis therethrough that is substantially colinear with the array centerline and a short axis, perpendicular to the long axis, and the dimension of each region along the short axis being substantially smaller than its dimension along the long axis, the system comprising— a cylindrical lens, disposed so that its focal line is essentially parallel to the array centerline, and an imaging lens assembly disposed between said cylindrical lens and the recording surface and operative to form an image of the array on the recording surface, said image consisting of a linear array of light spots, each light spot corresponding to a particular one of the light emitting regions.

According to further features in preferred embodiments of the invention described below, said image is essentially in focus in a direction parallel to the image centerline and is substantially spread in a direction normal to said image centerline. Preferably the dimension of each of said light spots in a direction normal to said image centerline is essentially equal to the dimension of that light spot in a direction parallel to said image centerline.

According to still further features in the described preferred embodiments, said imaging lens assembly has a telecentric configuration and is non-anamorphic.

According to yet other features in the described preferred embodiments, said cylindrical lens forms either a real image or a virtual image of the array centerline.

There is also disclosed a method for projecting the light emitted from a linear array of light emitting regions onto a recording surface, the the method comprising the steps of—

(a) providing a cylindrical lens, disposed so that its focal line is essentially parallel to the array centerline, and (b) providing an imaging lens assembly disposed and operative as described hereabove.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of an optical writing head according to the present invention may be better understood with reference to the drawings and the accompanying description.

Figure 2:
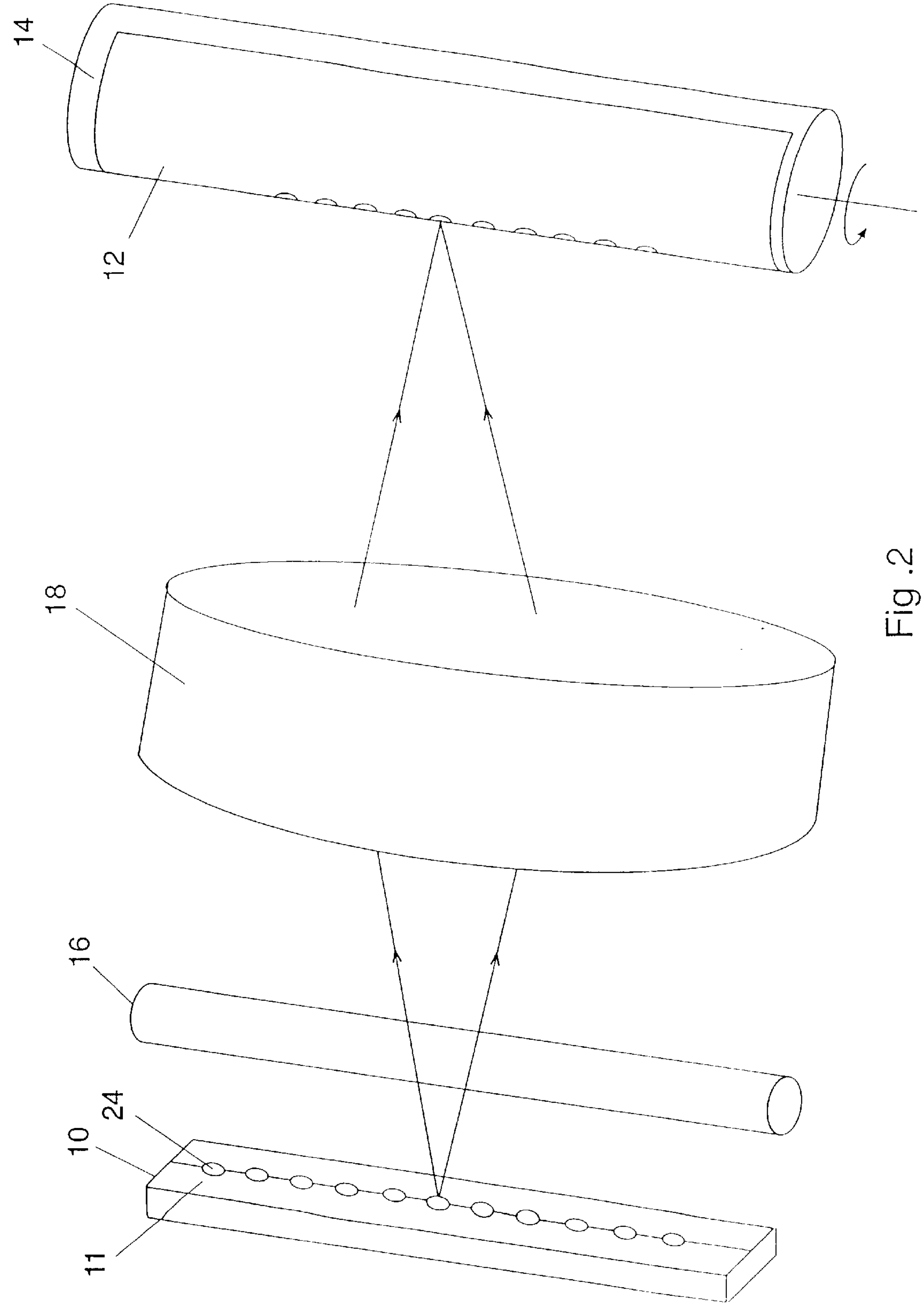
FIG. 2 is an isometric sketch of the array projection system according to the present invention.
Figure 3:
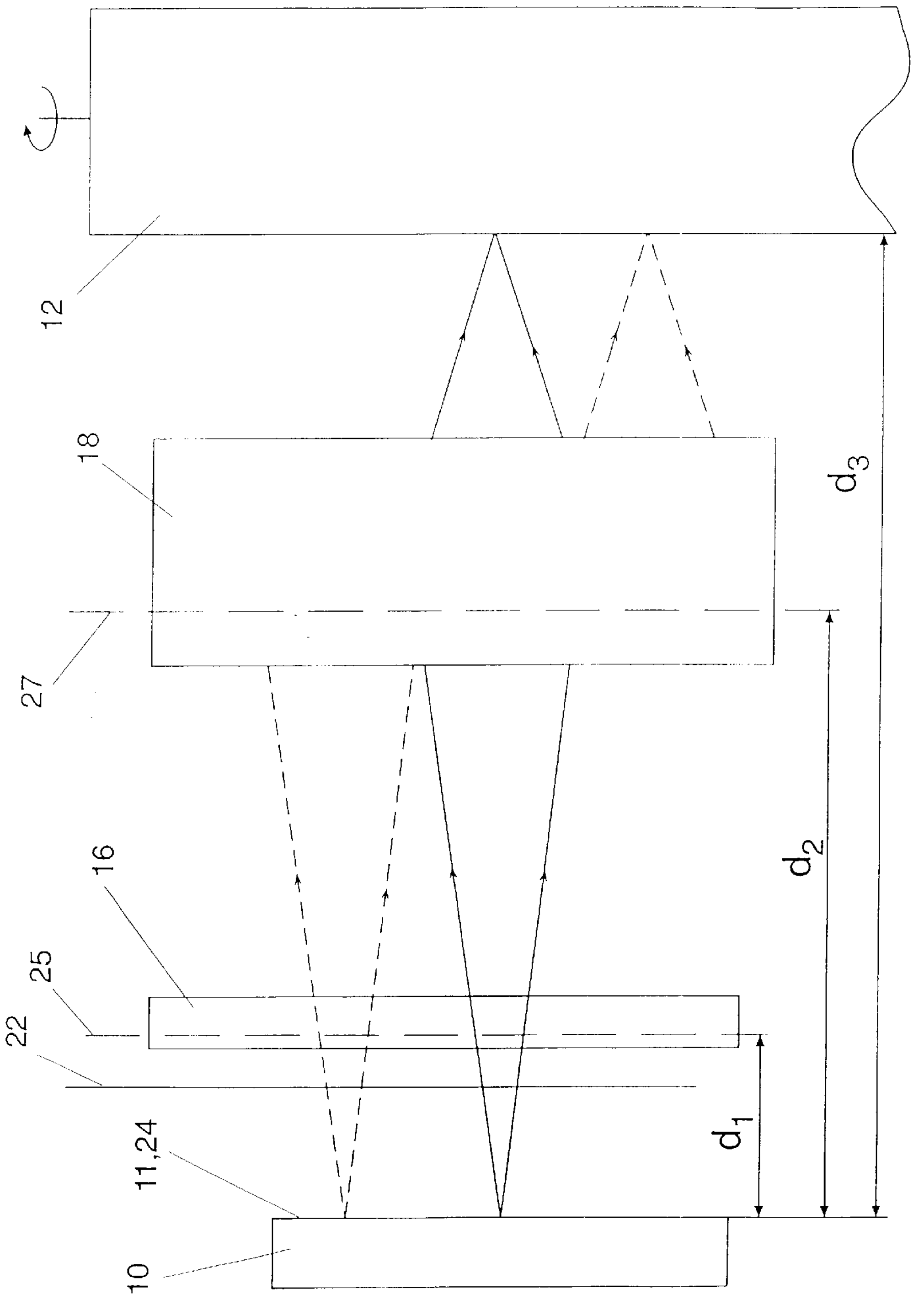
FIG. 3 is a cross-section view of the system of FIG. 2, showing the plane that includes the centerline of the array.
Figure 4:
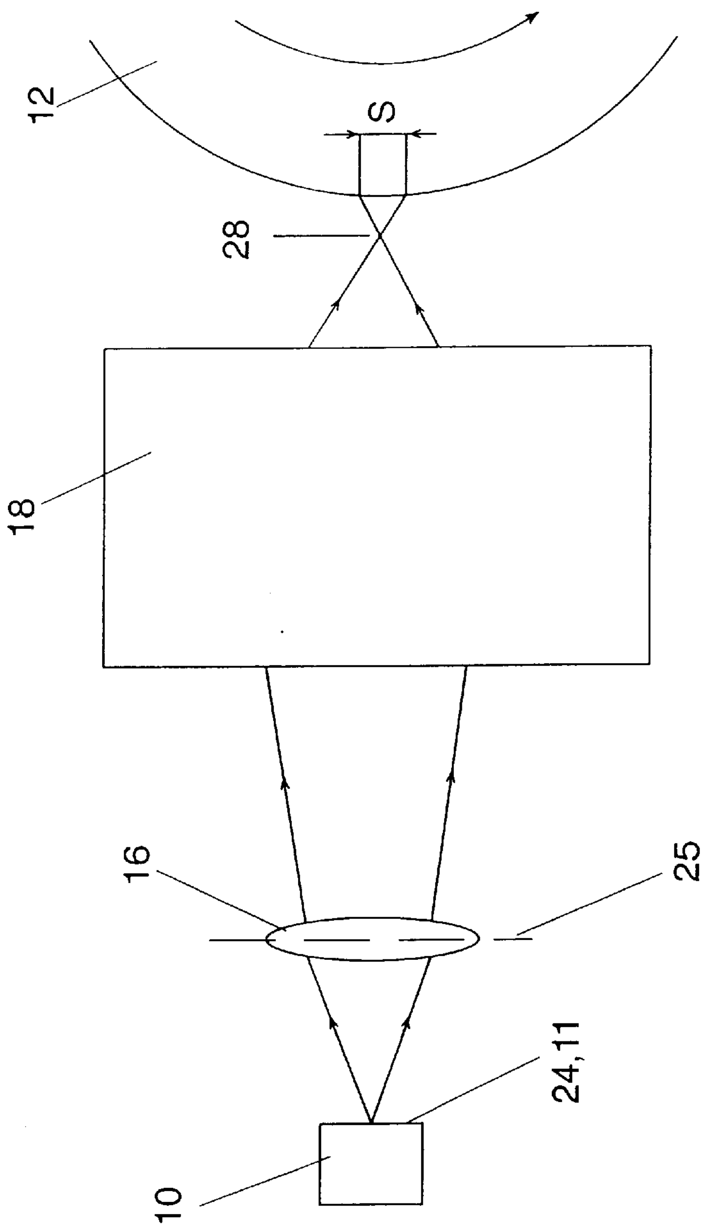
FIG. 4 is a cross-section view of the system of FIG. 2, showing the plane that is normal to the plane of FIG. 3.

Referring now to the drawings, FIGS. 2–4 illustrate the general configuration of the optical projection system to project the light emitted from an individually addressable laser diode array device (IALDA) 10 onto a film 12 while the thus projected light spots scan the film. In the example illustrated, the film 12 is wrapped around a rotating drum 14, as is typical for an external-drum imagesetter, but other configurations are possible too. The array consists of a row of lasing sections, spaced by non-lasing sections and ending with light-emitting regions at a plane face 11. Each lasing section is coupled to an individually addressable electrode, to which current is applied from a driver circuit (not shown) according to image signal and accordingly emits light in a beam that is generally centered about a line normal to face 11. Each emitting region is typically about 1 micrometer across and 60 micrometer long and the centerlines of all regions along their long dimensions are substantially colinear with a longitudinal array centerline 24 lying in the plane of emitting face 11.

Figure 1:
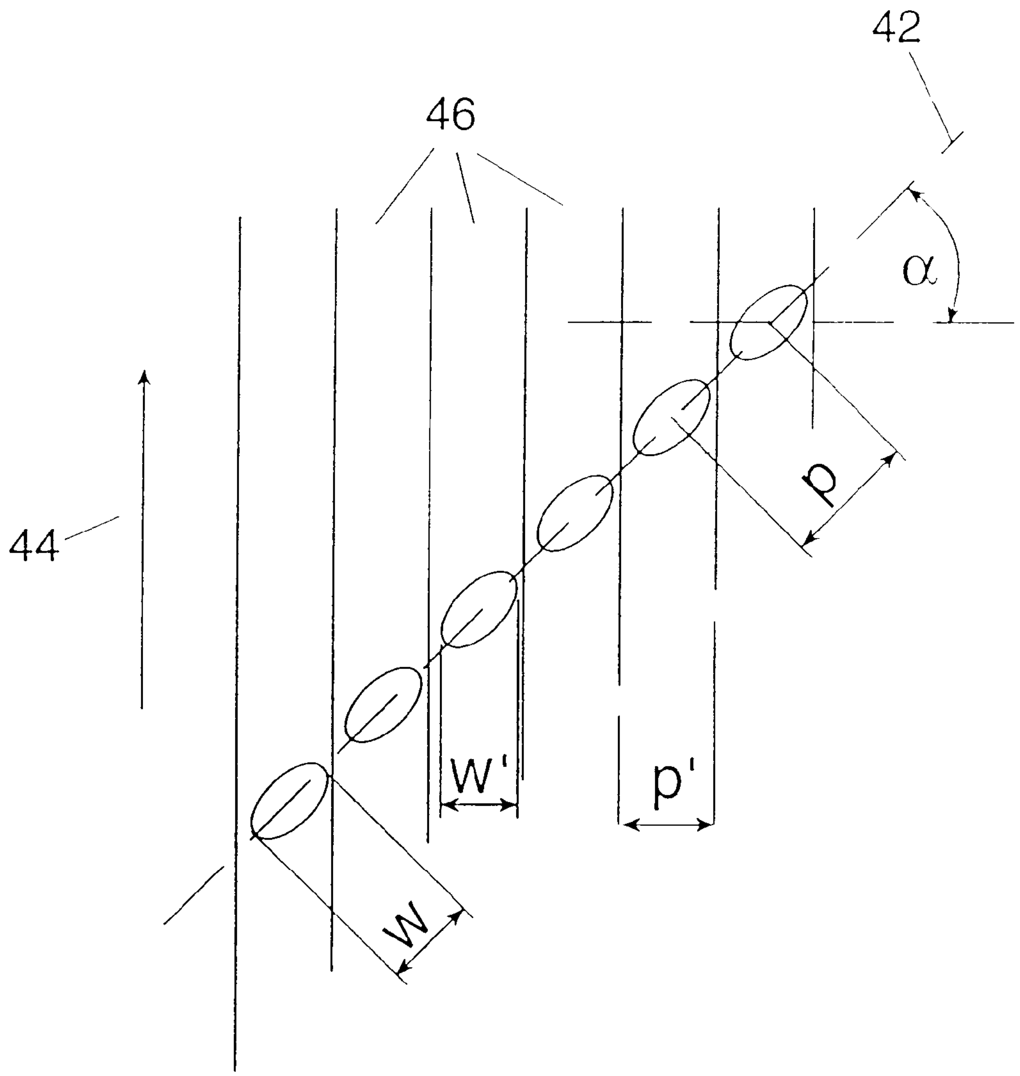
FIG. 1 is a sketch illustrating a typical array of projected light spots from a laser diode array, in relation to scanned traces, according to prior art.

The IALDA is positioned with its emitting face 11 essentially parallel to the section of film being scanned (or written on), at a distance d3 therefrom, and so that a line through the center of the array of emitting regions and normal to face 11 is also normal to that section of film. This normal line will be referred to as the optical axis of the (projection) system. Although the array and its centerline 24 are shown, in this example, as being parallel to the rotation axis of the drum, it may be inclined, within a plane normal to the system optical axis, at an angle α with respect to such a parallel position, in order to effect contiguous scan traces (as explained hereabove with respect to FIG. 1).

According to a preferred embodiment of the invention, there is provided a positive cylindrical lens 16, disposed so that its axial plane includes the optical axis of the system, its principal plane (within the meaning of a thin lens approximation) 25 is parallel to device face 11 and at a distance d1 therefrom and its focal line 22 is parallel to array centerline 24. The cylindrical lens is slightly longer than the array and has preferably a numerical aperture such that it intercepts essentially the entire width of the emitted beams diverging in the cross direction, that is—in any plane normal to centerline 24. As was noted in the background section, this divergence usually forms a relatively large angle—typically 45 degrees FWHM (corresponding to a NA of 0.4).

Practically all the light transmitted by cylindrical lens 16 is intercepted by a non-anamorphic imaging lens assembly 18, which serves to image face 11, with its light emitting regions, onto film 12. This imaging is done with a demagnification of typically 3, so that each 60 microns long emitting region produces a 20 microns long image. Clearly, in the absence of cylindrical lens 16, the convergence angle of the beams in the cross axis, if they fully passed through lens assembly 18, would have been commensurately larger than 45 degrees, namely, in this case, 140 degrees FWHM (corresponding to a NA of 0.95). This would require imaging lens assembly 18 to have an unrealistically large NA. It is the function of cylindrical lens 16, inter alia, to reduce the NA of the beams in the cross axis, before entering lens assembly 18, to a practical value.

Imaging lens assembly 18 may generally have any positive-acting configuration, preferably consisting of spherical elements and having relatively short conjugate focal distances. It is positioned so that its optical axis is normal to emitting face 11 of the IALDA device and centered about the array of emitting regions and so that its principal plane on the entrance side 27 is a distance d2 from face 11. Distances d2 and d3 are chosen, or adjusted to be, so that the projected image on the surface of film 12 has the desired size and is sharp in the direction parallel to centerline 24. It is noted that in this direction cylindrical lens 16 has relatively little effect.

As shown in FIG. 4, lens 16 decreases the divergence of the beams in the cross direction and, as a result, the images of the emitting regions are focused at a line 28 that is away from the surface of film 12, while at this surface the images are spread in the cross direction by an amount s. The distance d1 is preferably chosen, or adjusted to be, so that the spread s is approximately equal to the length dimension of the image. The shape of the image of each region is then approximately square and thus practically nears a circular spot. As has been explained in the Background section and shown in FIG. 1, a circular spot is desirable, for example, when the array (and its centerline 24) must be rotated about the system optical axis by an angle α, so that the traces of its image become contiguous. The need for a circular spot increases in direct relation to angle α.

Figure 5:
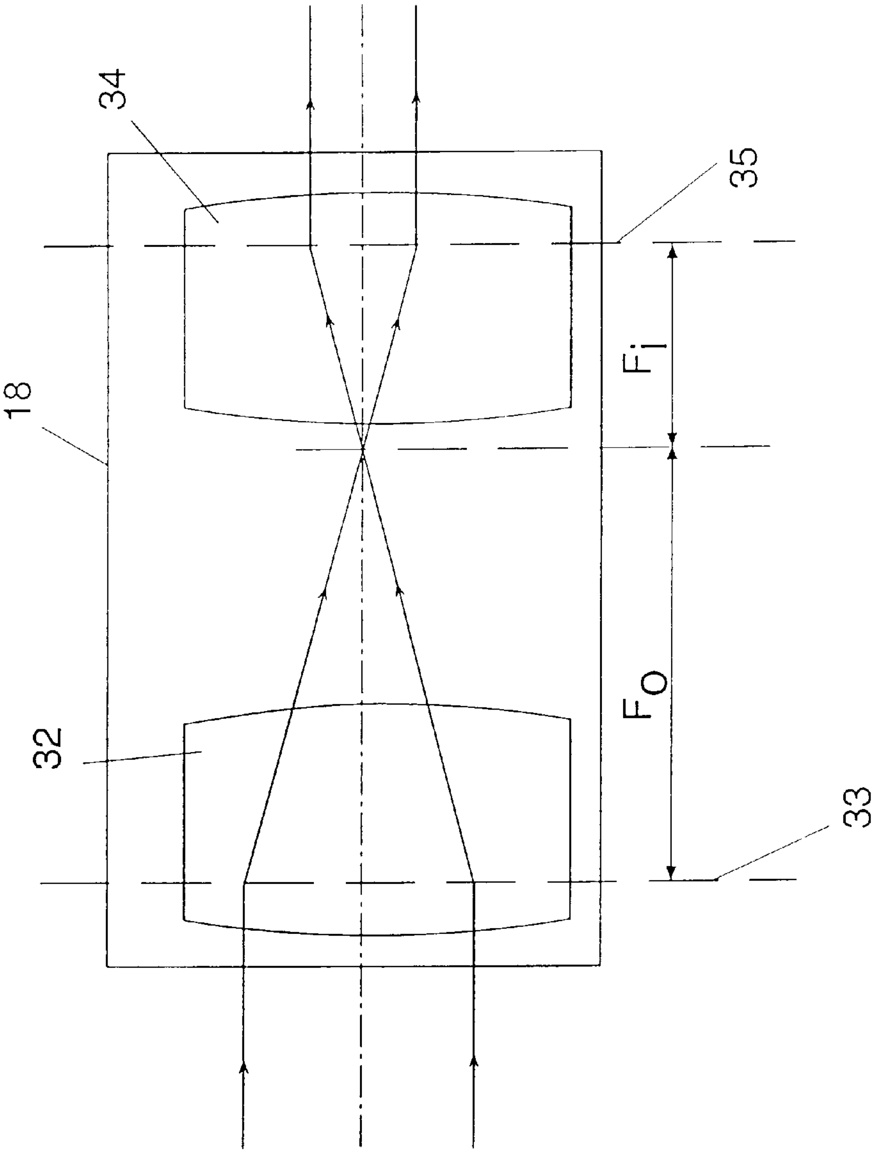
FIG. 5 is a cross-section view of a preferred configuration of the imaging lens assembly of the system of FIG. 2.

The operation of the IALDA light projection system will now be explained in further detail in conjunction with a preferred configuration of imaging lens assembly 18, as illustrated in FIG. 5. Here lens assembly 18 has a confocal telecentric configuration (that is—telecentric towards both the object plane and the image plane), which has the property that the principal ray from any object point enters and exits lens assembly 18 parallel to the optical axis. This property carries the advantage that the size of the projected image is insensitive to variations in the distances between the lens assembly and the object- and image planes (variations that could result from mechanical inaccuracies or vibrations).

Lens assembly 18 can be described as comprising two spherical lens groups—an object group 32, facing the IALDA and having a focal distance Of, and an image group 34, facing the film and having a focal distance Fi. In the present example Fo=3Fi. The distance between the two groups is such that their respective inner foci coincide, at point 36; in other words, the distance between their respective principal planes 33 and 35 is equal to Fo+Fi (which, in this case, is 4Fi).

Figure 6:
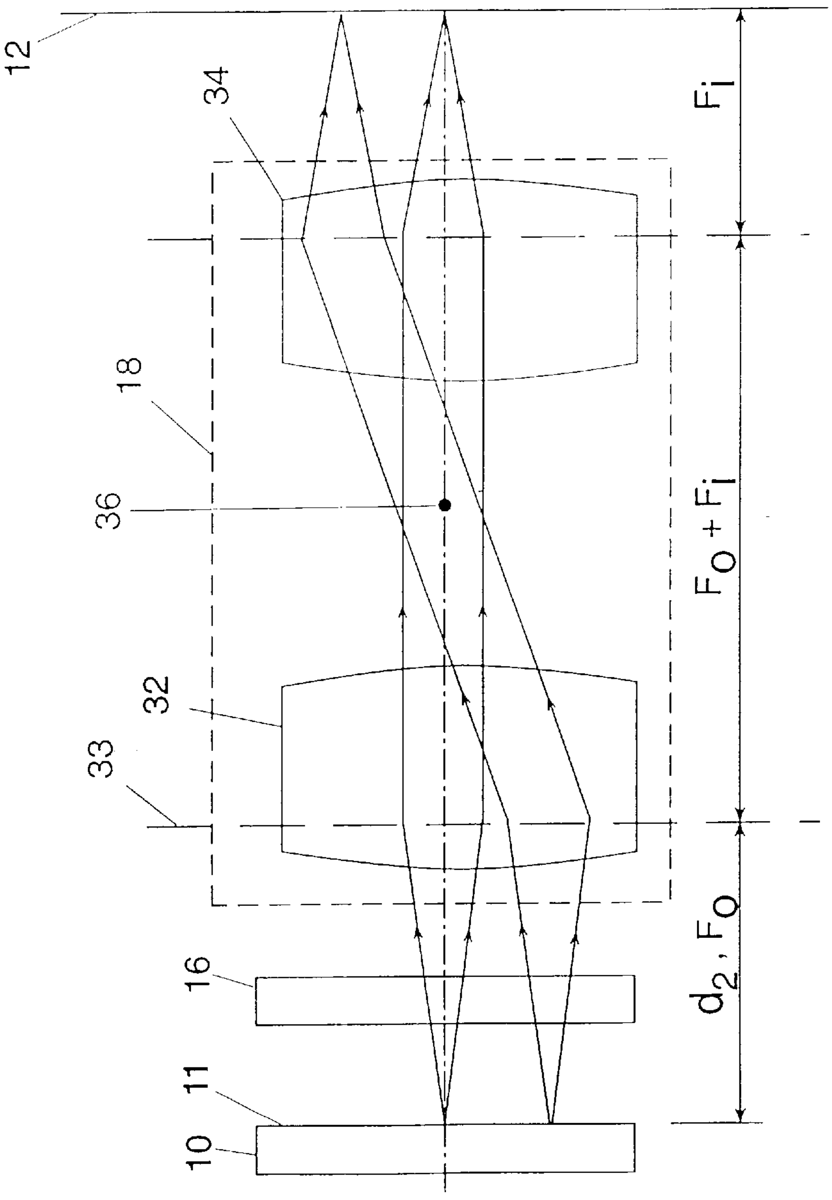
FIG. 6 is similar to FIG. 3, showing the ray traces through the imaging lens assembly of FIG. 5.

As can be seen in FIG. 6, which shows the system axial plane that includes array centerline 24, the principal plane (in the sense of a thin-lens approximation) 33 of object group 32 (which is identical to the entrance principal plane 27 of FIG. 3) is positioned at a distance d2 from emitting face 11 that is equal to Fo, and principal plane 35 of image group 34 is positioned at a distance from film 12 that is equal to Fi. As a result, light emitted from any point on the array is collimated by object group 32, the central ray of any such beam passing through the common focal point 36, and is focused by image group 34 onto the film. It is noted that distance d2 must be adjusted to account for the effect in the parallel axis of cylindrical lens 16 on the optical path, which is essentially uniform.

Figure 7:
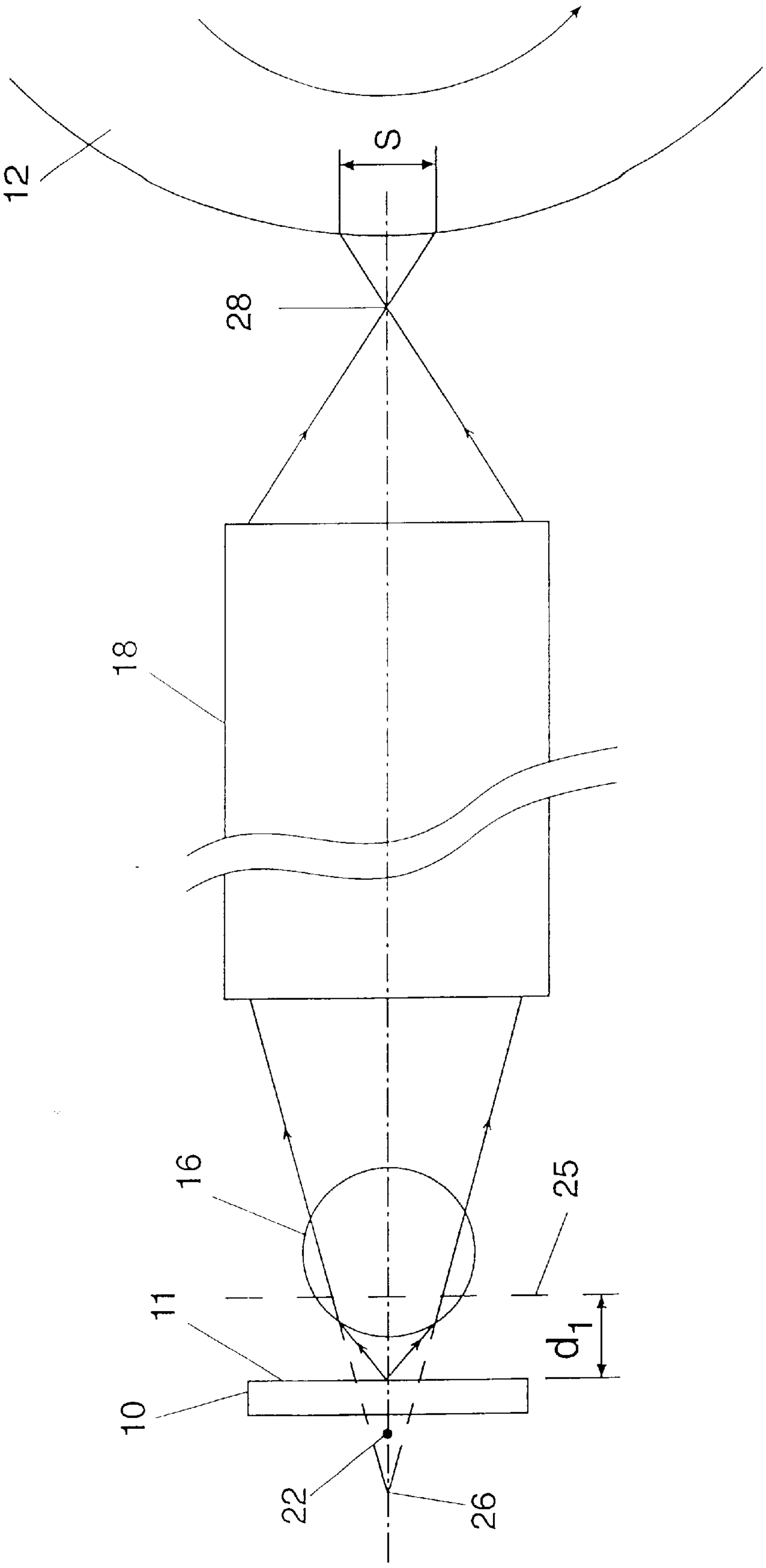
FIG. 7 shows ray traces of the object end of a preferred configuration of the optical system of FIGS. 6.

The effect of cylindrical lens 16 on the light emitted from each region in the cross direction generally remains as was described hereabove in reference to FIG. 4. Lens 16, which may generally be a simple lens, a compound lens or even a lens group, preferably consists of a piece of optical fiber, available from Team Technologies, Auburn, Calif. The fiber may have various sizes and cross-sectional shapes and structures; in the present example it has a circular cross-section, with diameter 2R, as illustrated in FIG. 7. The value of R is typically in the range of 0.07 to 5 mm. Its focal distance, namely the distance from its front focal line 22 to its principal plane 25, is approximately equal to R. There is a range of possible values for d1 (which was defined above as the distance from array centerline 24 to principal plane 25 of lens 16) such that the entire width of all the light beam in the cross direction will refract into the entrance pupil of objective group 32 of imaging lens assembly 18. This range extends from a certain value at which focal line 22 is behind array centerline 24, to a certain value at which focal line 22 is in front of array centerline 24. However, only a few particular values within this range result in the other desirable effect, namely the widening of the projected spots to become equal to their length dimension. These particular values will be associated with certain configurations, described in what follows.

The most preferred configuration is illustrated in FIG. 7. Here d1 is shorter than the focal distance (that is, emitting face 11 is closer to lens 16 than is its focal line 22). As is clearly seen in FIG. 7, lens 16 produces in the cross direction a virtual image of the array, which lies at a line 26 behind focal line 22. This virtual image serves as a virtual object for lens assembly 18, which projects therefrom a real image onto film 12. As seen in FIG. 7, this image is in focus at a line 28, which lies a certain distance in front of the film, while at the plane of the film it is spread out to a dimension s. The distance d1 is chosen or adjusted to be such that s is essentially equal to the length dimension of an image spot (which, in our example, is 20 microns). The relation between s and d1 is approximately governed by the following expression, which is derived by the principles of geometric optics:

$$s=2*d1*(\tan\theta_1/\tan\theta_2-1)*\theta_2/m,$$

where $\theta_1$ is the divergence angle of the beam in the cross direction upon exiting face 11, $\theta_2$ is the divergence angle of the beam in the cross direction upon exiting lens 16 and m is the demagnification factor (which, in our example, is 3).

The parameters of the various lenses are chosen to be such that when this condition is obtained, all light beams fully clear the apertures of all lenses. Another consideration is to minimize spherical aberrations, by keeping the focal length of the cylindrical lens as short as possible. The required calculations can be made by persons knowledgeable in geometric optics. One practical set of parameters, for the array in our example having a length 10 mm, with d1=0.1 mm and s=20 microns, is as follows:

Cylindrical lens 16: F=1 mm, NA=0.45;

Object group 32: F=60 mm, NA=0.14;

Image group 34: F=20 mm, NA=0.45.

Figure 8:
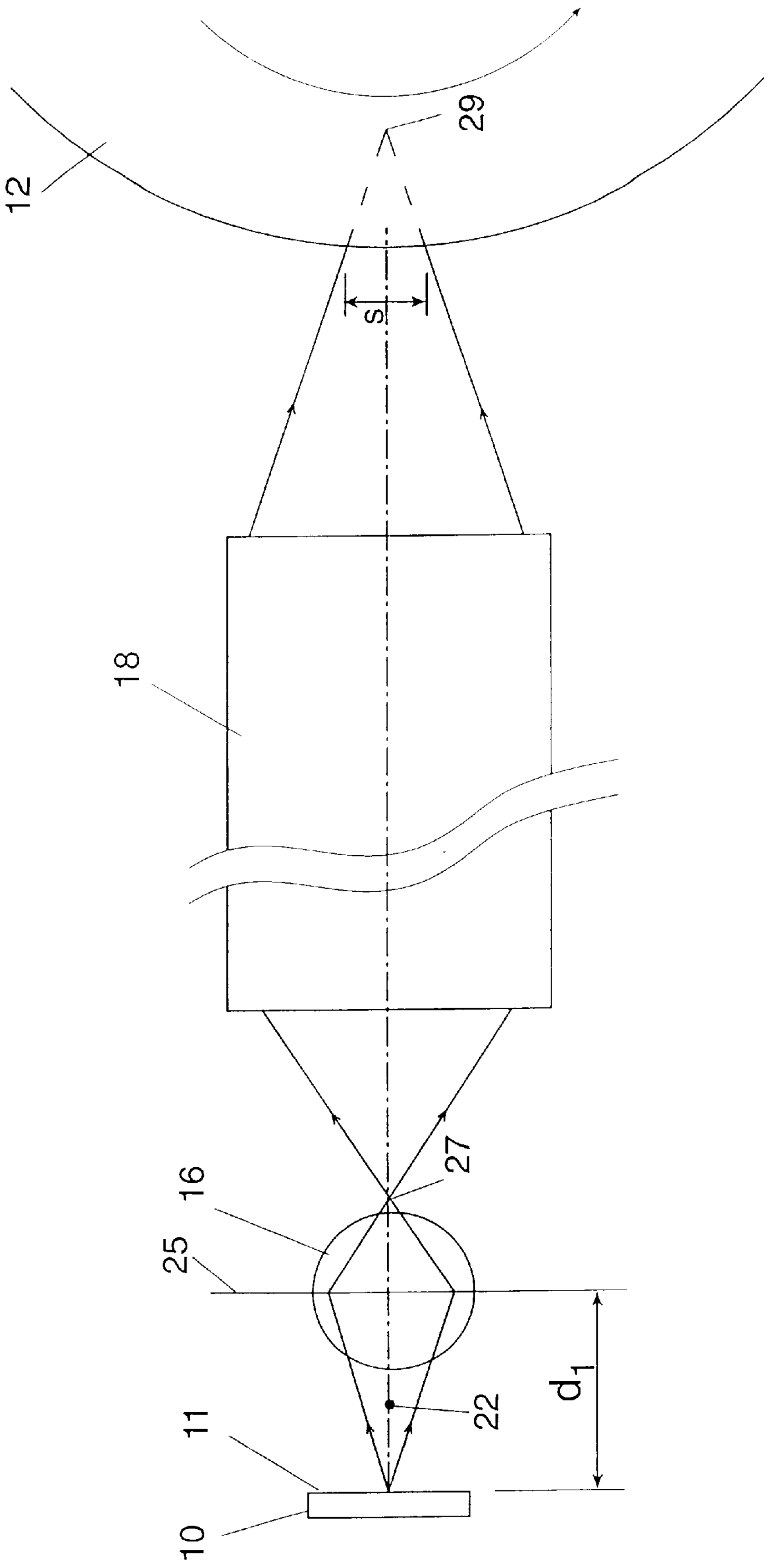
FIG. 8 is similar to FIG. 7, showing an alternative configuration of the optical system.

According to an alternative configuration, shown in FIGS. 8, d1 is longer than the focal distance of the cylindrical lens (that is, focal line 22 is between lens 16 and emitting face 11), so that lens 16 forms in the cross direction a real image of the emitting array at a line 27 between lens 16 and object group 32, as seen in FIG. 8. The distance between lens 16 and image line 27 is made to be large enough for the resultant beam divergence to be within the acceptable range. Imaging lens assembly 18 projects line 27 onto the film, but, as is illustrated in FIG. 8, the projected image would be focused at a line 29 behind the film, while at the plane of the film it is spread out to a dimension s. Again, by judicious choice of parameters, the spread s can assume the desired size.

Figure 9:
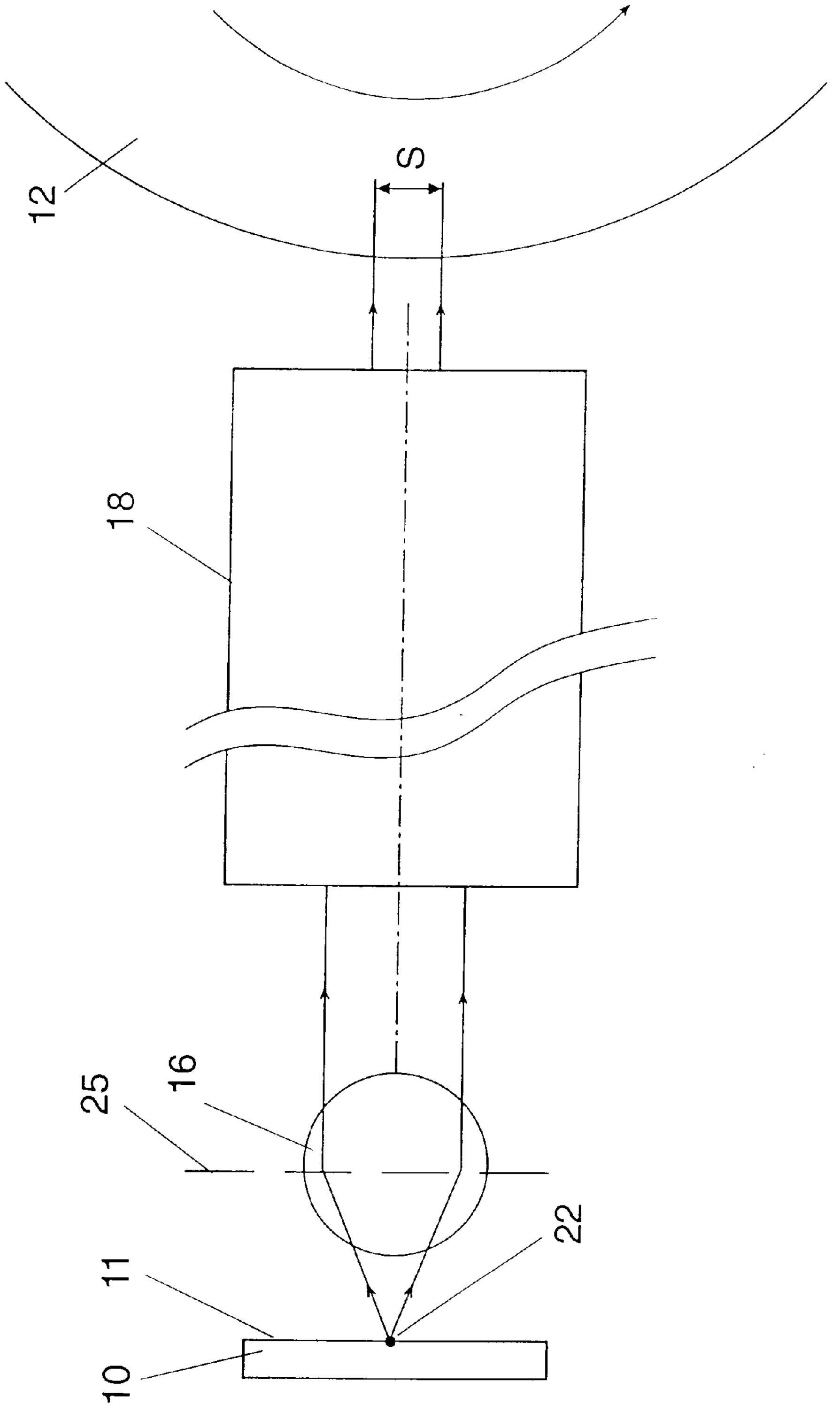
FIG. 9 shows ray traces of yet another configuration of the optical system of FIGS. 6.

According to yet another configuration, shown in FIG. 9, focal line 22 of lens 16 coincides with array centerline 24. As a result, all beams are collimated in the cross direction. They also exit from imaging lens assembly 18, and hit film 12, collimated. The resultant spots on the film have then a size, in the cross direction, equal to the width of the collimated beams. This width is determined by the emitted divergence angle, θ1, and by the focal length of lens 16. By proper choice of the latter, the spots can be made to have the desired width s.

I tis noted that the optical projection system of the present invention is relatively simple and that, moreover, it does not require careful alignment beyond the usual axial alignment, the only critical adjustments being those of distance d1 and of distance d2 (or d3); its manufacturing costs should therefore be relatively low.

It will be appreciated that, although described with respect to an IALDA device, the present invention is also applicable to other light emitting array devices and to arrays of discrete light emitting diodes. It will be appreciated that, while the invention has been described with respect to a limited number of embodiments, many variations, modifications and other applications of the invention may be made.

What is claimed is:

1. An optical system for projecting light emitted from a linear array of light emitting regions within a planar surface onto a recording surface, all regions being essentially bisected by one line, defined as the array centerline, the system comprising— a cylindrical lens assembly, having a front focal line, disposed so that its front focal line is essentially parallel to the array centerline, and an imaging lens assembly, all optical elements of which are axially symmetric, disposed between said cylindrical lens assembly and the recording surface, wherein each optical element of each of said lens assemblies substantially receives light from all the light emitting regions, both of said lens assemblies being cooperative to solely form an image of the array on the recording surface, said image consisting of a linear array of light spots, whereby each light spot is an image of a corresponding one of the light emitting regions.

2. The system of claim 1, wherein said imaging lens assembly has a telecentric configuration.

3. The system of claim 1, wherein said image has an image centerline that bisects all of said light spots and wherein said image is essentially in focus in a direction parallel to the image centerline and is substantially defocussed in a direction normal to said image centerline.

4. The system of claim 3, wherein the dimension of each of said light spots in a direction normal to said image centerline is essentially equal to the dimension of that light spot in a direction parallel to said image centerline.

5. The system of claim 1, wherein said cylindrical lens assembly has a single element, which is an optical fiber.

6. The system of claim 1, wherein said cylindrical lens assembly forms a real image of the array of light emitting regions.

7. The system of claim 1, wherein said cylindrical lens assembly forms a virtual image of the array of light emitting regions.

8. The system of claim 1, wherein the front focal line of said cylindrical lens assembly essentially coincides with the array centerline.

9. The system of claim 1, having no lenses or optical lens elements outside said cylindrical lens assembly and said imaging lens assembly.

10. The system of claim 1, wherein the axial position of said cylindrical lens assembly, or any element thereof, along a line normal to the planar surface of the array of light emitting regions, is adjustable.

11. The system of claim 10, wherein the dimension of each light emitting region in a direction normal to the array centerline is substantially smaller than the dimension of that light emitting region in a direction parallel to the array centerline, and wherein each of said light spots is spread in a direction normal to said image centerline, the amount of spreading being determined by said axial position.

12. The system of claim 1, wherein each optical element of said cylindrical lens has a front focal line and is disposed so that its front focal line is essentially parallel to the array centerline.

13. An optical system for projecting light emitted from an individually addressable laser diodes array device onto a recording surface, the device having a planar emitting surface that has a corresponding array of light emitting regions thereon and an array centerline that essentially bisects all the light emitting regions, the system comprising— a cylindrical lens assembly, each optical element of which has a front focal line and is disposed so that its front focal line is essentially parallel to the array centerline, and an imaging lens assembly disposed between said cylindrical lens assembly and the recording surface, all optical elements of which are axially symmetric, both of said lens assemblies being cooperative to solely form an image of the array of light emitting regions on the recording surface, said image consisting of a linear array of light spots, whereby each of said light spots is an image of a corresponding one of the light emitting regions.

14. The system of claim 13, wherein said image has an image centerline that bisects all of said light spots and wherein said image is essentially in focus in a direction parallel to the image centerline and is substantially defocussed in a direction normal to said image centerline.

15. The system of claim 13, having no lenses or optical lens elements outside said cylindrical lens assembly and said imaging lens assembly.

16. The system of claim 13, wherein each optical element of each of said lens assemblies substantially receives light from all the light emitting regions.

17. The system of claim 13, wherein the axial position of said cylindrical lens assembly, or any optical element thereof, along a line normal to the planar surface of the array of light emitting regions, is adjustable.

18. The system of claim 17, wherein the dimension of each light emitting region in a direction normal to the array centerline is substantially smaller than the dimension of that light emitting region in a direction parallel to the array centerline, and wherein each of said light spots is spread in a direction normal to said image centerline, the amount of spreading being determined by said axial position.

19. A system for projecting a linear array of light spots onto a recording surface, while there is scanning motion, along a scan direction, between the recording surface and the array of light spots, the array being centered about an aim point, the system comprising— an individually addressable laser diodes array device, having a planar emitting surface with an array of light emitting regions thereon, an array centerline, which essentially bisects all of said light emitting regions, and an array centerpoint, lying on said array centerline, a cylindrical lens assembly, having a single front focal line, disposed so that said front focal line is essentially parallel to said array centerline, and an imaging lens assembly, all optical elements of which are axially symmetric, disposed between said cylindrical lens assembly and the recording surface, there being no lenses or optical lens elements outside said cylindrical lens assembly and said imaging lens assembly, and said laser diodes array device and said imaging lens assembly being so positioned, relative to the recording surface, that said array centerpoint and the aim point essentially lie, respectively, on a pair of conjugate image planes of said imaging lens assembly.

20. The system of claim 19, wherein an image of said array centerline, as projected onto the recording surface, forms an angle with the scan direction that is substantially different from 90 degrees.

21. The system of claim 19, wherein the position of said cylindrical lens assembly, or any element thereof, relative to said laser diodes array device, along a line normal to said emitting surface, is adjustable and wherein said position affects the dimension of each light spot essentially along only one direction.

22. The system of claim 19, wherein the dimensions of each light spot along any pair of orthogonal axes are essentially identical.

23. The system of claim 19, wherein each optical element of each of said lens assemblies substantially receives light from all the light emitting regions.

24. The system of claim 19, wherein each element of said cylindrical lens has a front focal line and is disposed so that its front focal line is essentially parallel to the array centerline.

25. A method for projecting light emitted from a linear array of light emitting regions within a planar surface onto a recording surface, all regions being essentially bisected by one line, defined as the array centerline, the method comprising the steps of—

(a) providing an imaging lens assembly, all optical elements of which are axially symmetric, and positioning it and the array, with respect to the recording surface, so that the surface of the array and a plane tangent to the recording surface essentially coincide, respectively, with a pair of conjugate image planes of the imaging lens assembly;

(b) providing a cylindrical lens assembly, which has a single front focal line, and positioning it between the array and said imaging lens assembly so that said front focal line is essentially parallel to the array centerline, whereby said cylindrical lens assembly and said imaging lens assembly become cooperative to solely form an image of the array on the recording surface, said image consisting of a linear array of light spots, each light spot corresponding to a particular one of the light emitting regions; and (c) adjusting the distance between the planar surface of the array of light emitting regions, on the one hand, and said cylindrical lens assembly, or any element thereof, on the other hand, so as to obtain any desired ratio between certain two orthogonal dimensions of any of said light spots.

26. The method of claim 25, where by the front focal line of said cylindrical lens assembly essentially coincides with the array centerline.

27. The method of claim 25, where by said cylindrical lens assembly forms a real image of the array centerline.

28. The method of claim 25, where by said cylindrical lens assembly forms a virtual image of the array centerline.

29. The method of claim 25, whereby there are no lenses or optical lens elements placed outside said cylindrical lens assembly and said imaging lens assembly.

30. The method of claim 25, whereby each optical element of each of said lens assemblies substantially receives light from all the light emitting regions.

* * * * *